Figure 1:
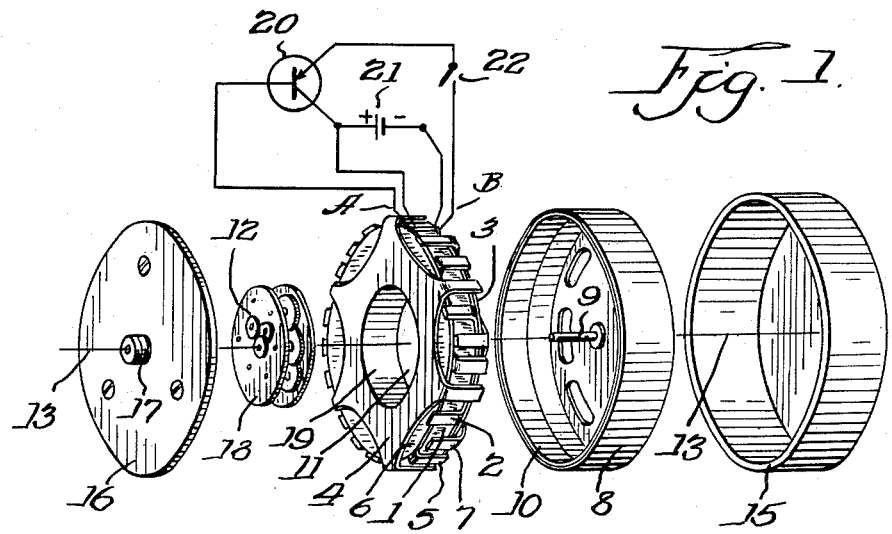

March 23, 1965  F. THOMA  3,175,112
MOTOR FOR DRIVING CLOCKS AND OTHER CHRONOLOGICALLY
EXACT RUNNING GEARS
Filed May 26, 1958

Inventor.
Fritz Thoma.
By [signature] Atty.

United States Patent Office 3,175,112
Patented Mar. 23, 1965

3,175,112
MOTOR FOR DRIVING CLOCKS AND OTHER CHRONOLOGICALLY EXACT RUNNING GEARS
Fritz Thoma, St. Georgen, Black Forest, Germany, assignor to Kieninger & Obergfell, St. Georgen, Black Forest, Germany, a German company
Filed May 26, 1958, Ser. No. 737,959
Claims priority, application Germany, May 27, 1957, K 32,060; July 1, 1957, K 32,318; Apr. 16, 1958, K 34,605
5 Claims. (Cl. 310—164)

The present invention relates to a motor and particularly to a synchronous motor of the hysteresis type. Such motors allow for a relatively compact construction and they can, therefore, be used successfully for driving clocks and other running gears, whereby devices with small dimensions are obtained. The clock-work or other running gear was mounted up to now—when assembling the device—on the motor element surrounded by the coil, whereby both elements—viz. the motor and the running gear—were generally executed cylindrically and had about the same diameter.

It is an object of the invention to provide an arrangement, by which a unit of motor and running gear, respectively a clock-work of extremely small dimensions is obtained.

According to the invention this aim is reached in a surprisingly simple manner by configurating and dimensioning the movable part and the coil in such a way that the interior of the coil is fully or partially used to enclose the running gear. This can be made e.g. in such a way that the movable part is executed as a ring-shaped rotor, e.g. as an interior rotor, the one side of which is closed by a cover and through the other side of which the running gear can be inserted into the interior of the rotor. A particularly expedient embodiment consists in the provision of an outer rotor which surrounds the coil and the pole shoes from the exterior and which is journalled rotatably on one side of the ring surface.

The motor arrangement according to the invention has not only the advantage of an extremely flat execution but makes possible at the same time the manufacture of a synchronous watch of relatively few parts, as particularly the casing for the said clock is not necessary.

In principle the synchronous motor can be provided in known manner with a hysteresis rotor or can also be executed as a Warren-motor with permanent rotor for self-starting or with soft-iron rotor as starting motor. In order to establish the running direction the poles are at least partially executed as split-poles with short-circuited winding. For specific fields of application it might, however, be advantageous to provide a mechanical ratchet device for limiting the direction of running.

By the invention a particularly compact construction of the complete clock with smallest possible dimensions becomes possible. It is particularly expedient to arrange the rotary armature on the minute drive shaft of the clock-work respectively on its extension and to provide the pole shoes of the magnet as punched parts which surround the coil. In this case it is possible to arrange the gear mechanism in form of a gear set on a circle rotation-symetrically around the minute shaft and within the coil arrangement of the electro-magnet, in which case the height of the gear mechanism is suitably adapted to the height of the coil.

A further feature of the invention consists in the fact that the motor is made suitable for drive by means of direct current by a combination with an already proposed electronic oscillator wiring diagram (Serial Number 714,464 of the U.S. patent application, now Patent No. 3,124,730), the essential feature of which consists in the fact that the input and output circuit of an electrically controllable semi-conductor construction element, e.g. a transistor, a double basis diode, a ring modulator with ferrite core, a Hall generator or another electronic construction element with pronounced switching effect is fed back over coils in such a way, that the frequency of the switching process and of the electrical oscillation of the circuit caused hereby is determined essentially by the delay of the feedback process caused by the coil remanence.

This proposed wiring arangement must be considered as a low frequency oscillator which is fed with direct current and yields an alterating voltage respectively an alternating current with a very low frequency, which may be in the acoustic frequency range and lower and is, therefore, suitable for driving or controlling clocks and other chronologically exact running gears.

According to another embodiment of the inventive idea the winding of the synchronous motor according to the main patent serves itself fully or partially as at least one of the coils of the electronic oscillator arrangement. Advantageously both windings are arranged concentrically to each other and dimensioned in such a way, i.e. in respect of their ampere winding numbers that a maximum excitement of the stator magnet field is guaranteed. The electronic control member respectively transistor and possibly other switching members necessary for the oscillator wiring can be incorporated possibly in common with the running gear in the interior of the coil arrangement. If the rotor is arranged, however, as an interior rotor or if the inner space is limited for other reasons, it is possibly necessary to mount the transistor or the like outside of the space enclosed by the coils.

The invention is to be elucidated further with reference to the drawings which illustrate embodiments of the device according to the invention.

Figure 2:
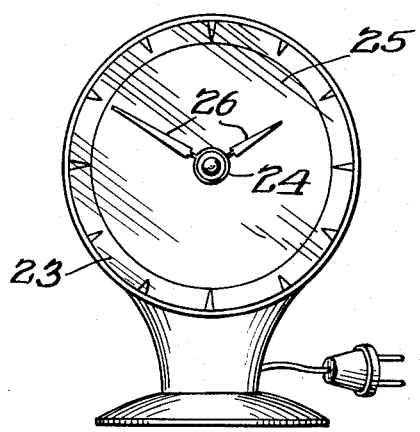

FIG. 1 shows the interior design, and FIG. 2 shows the outer form of the arrangement of the synchronous motor according to the invention.

As hereinafter described in detail, the invention is directed to the construction of exceedingly small watch or clock movements, which could not be fabricated by techniques previously employed.

The invention proposes to utilize an annular coil winding forming a part of the motor, spring-winding or like structure, in which such coil, the rotor or movable mechanism, and the clock work associated therewith to complete the colck or watch structure, are disposed in a concentric arrangement with the coil and rotor or its equivalent encircling the necessary clock work. In contrast, mechanisms of this type heretofore were disposed in axial arrangements, which rendered them totally unsuitable for small watch movements and the like, obviously requiring small, flat structures.

1 is a ring-shaped coil on each side of which are applied three ring discs 2, 3, 7 and 4, 5, 6. The discs 2, 4, 5 and 7 are iron sheet metal pieces with pole lugs bent over at the edge which are shaped and arranged to each other in known manner in such a way that on the outer rim of the coil 1, two rings of split poles are formed which engage each other in the manner of combs.

The motor has an eight-pole stator made of sheet metal, the poles of which conduct alternately out of phase flux. The ring discs 3 and 6 consist of copper and serve to oppose the flux produced by the main stator winding. 8 is an outer drum rotor of non-magnetic material, particularly aluminum, which can be rotated around the shaft, which surrounds the pole shoe rings at their periphery and which has in the interior a seamless ring 10 of high coercive force, particularly cobalt steel. Into the interior 11 surrounded by the coil 1 is inserted a clock-work 18 of known design with a reduction mechanism which is shown only by means of some gear wheels 12. The minute shaft 13, which is adapted to carry the minute hand protrudes out of the casing 15 to the rear, i.e. to the left in the drawing. 17 is a thread provided on the casing which serves for the central mounting of the motor, respectively the clock-work or other running gear at 16 to other devices.

The outer pole rings 4 and 7 are spot-welded to a return flux ring 19. The discs 2 are spot-welded to the copper disc 6 and the pole discs 5 to the copper disc 3.

The ring-shaped winding 1 of the stator is formed of two concentrical partial windings in the manner of an auto-transformer, from which windings two pairs of leads A and B to extend the input and output of a transistor circuit and form together with this letter an electronic oscillator. This oscillator consists of a transistor 20, a direct current source, particularly a battery 21 and a hand switch 22.

The battery 21 is preferably adapted to the form of the synchronous motor and/or that of the mechanical running gear. The said battery including the charging set is preferably of disc form so that it can be put on the motor and can be possibly shifted at least partially into the interior 11 of the winding. By a slight increase of the construction height with corresponding diminution of the diameter of the winding ring the object can be reached that the battery, possibly including the charging set arrangement can be provided as a disc-shaped insert in the interior 11 of the motor.

As the complete device according to the invention can be executed with a total diameter of 30 to 40 millimeters and a cylinder height of 80 to 120 millimeters (excluding the threaded extension), it is suitable for incorporation into other construction units in all those cases in which only small space is available, as e.g. in measuring devices in which other elements occupy already most of the space available, or where the running gear should be as inconspicuous as possible, as e.g. in the case of table- or wall-clocks which are made in such a way that the onlooker sees nearly only the hands and the numbers of the dial face.

As an example for such an incorporation into a casing a table clock is shown in FIG. 2. It consists of a ring-shaped dial face 23 which encloses a circular transparent disc of glass or plastic material. 24 is the synchronous clock according to the invention, which is mounted in the middle of the disc 25 and which is provided with relatively large hands 26.

It will be apparent from the above description that the invention is of particular advantage in the manufacture of wrist and pocket watches, as well as other small time pieces, and that various changes and modifications can be made without departing from the spirit thereof, hence I do not wish to be understood as limiting myself to the exact form construction and arrangement shown and described, or uses mentioned.

I claim:
1. A synchronous motor for time pieces, comprising a rotor carried by a shaft, a ring core stator including an annular shaped coil, a gear mechanism, the inner diameter of the ring core space exceeding the size of the rotor shaft to such extent that gear parts of the mechanism can be disposed therein, the ring core space and the gear mechanism system being mutually so related that the entire gear mechanism from the motor to pointers for the time piece and including bearing plates in which the mechanism is carried, is disposable in the hollow space of the coil, said rotor consisting of a drum made of light metal with a hysteresis band arranged therein, hour and minute shafts extending coaxially to the rotor axis, rearwardly outside of the housing, so that the pointers can be set from the rear side, the rotor drum being arranged concentric to the coil.

2. A synchronous motor according to claim 1, wherein the dial is, with respect to the motor and operating mechanism, so dimensioned that it also serves as a housing for the time piece.

3. A synchronous motor according to claim 1, wherein there are provided two concentrically disposed stator coils, one of said coils lying in the input of an electronic transistor switching element, and the other coil being disposed in the output thereof, said coils forming with the electronic switching element a low frequency oscillator which is supplied from a battery disposed in the output of the circuit.

4. A synchronous motor according to claim 3, wherein the winding of the motor forms, at least partially, at least one of the two coils of the electronic circuit.

5. A synchronous motor according to claim 3, wherein the components of the oscillator circuit, including the transistor are arranged at least partially within the interior of the motor coil.

References Cited by the Examiner

UNITED STATES PATENTS

| | | | |
|---|---|---|---|
| 42,230 | 6/64 | Schwippl | 58—45 |
| 802,910 | 10/05 | Burmeister | 58—45 |
| 2,289,495 | 7/42 | Hansen et al. | 310—164 |
| 2,430,782 | 11/47 | Poole | 58—45 |
| 2,460,358 | 2/49 | Packard | 310—164 |
| 2,890,400 | 6/59 | Cluwen | 318—254 |
| 2,988,868 | 6/61 | Levet et al. | 58—23 |

FOREIGN PATENTS 746,465  3/56  Great Britain.

MILTON O. HIRSHFIELD, Primary Examiner.

ORIS L. RADER, Examiner.